United States Patent
Frey et al.

(10) Patent No.: US 10,331,566 B2
(45) Date of Patent: Jun. 25, 2019

(54) OPERATION OF A MULTI-SLICE PROCESSOR IMPLEMENTING ADAPTIVE PREFETCH CONTROL

(71) Applicant: International Business Machines Corporation, Armonk, NY (US)

(72) Inventors: Bradly G. Frey, Austin, TX (US); George W. Rohrbaugh, III, Charlotte, VT (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/366,076

(22) Filed: Dec. 1, 2016

(65) Prior Publication Data

US 2018/0157602 A1 Jun. 7, 2018

(51) Int. Cl.

| G06F 12/00 | (2006.01) |
|---|---|
| G06F 12/0862 | (2016.01) |
| G06F 12/0842 | (2016.01) |
| G06F 9/50 | (2006.01) |
| G06F 9/455 | (2018.01) |

(52) U.S. Cl.
CPC ...... *G06F 12/0862* (2013.01); *G06F 9/45541* (2013.01); *G06F 9/45558* (2013.01); *G06F 9/5083* (2013.01); *G06F 12/0842* (2013.01); *G06F 2009/45583* (2013.01); *G06F 2212/1016* (2013.01); *G06F 2212/152* (2013.01); *G06F 2212/502* (2013.01); *G06F 2212/6024* (2013.01)

(58) Field of Classification Search
None
See application file for complete search history.

(56) References Cited

U.S. PATENT DOCUMENTS

| 7,996,624 B2 | 8/2011 | Kadambi et al. |
|---|---|---|
| 8,006,070 B2 | 8/2011 | Gschwind et al. |
| 8,688,960 B2 | 4/2014 | Accapadi et al. |
| 2002/0161932 A1* | 10/2002 | Herger .............. G06F 12/08 719/321 |
| 2013/0152099 A1 | 6/2013 | Bass et al. |

(Continued)

OTHER PUBLICATIONS

Ebrahimi, Prefetch-Aware Shared-Resource Management for Multi-Core Systems, Computer Architecture (ISCA), 2011 38th Annual International Symposium, pp. 141-152, Jun. 8, 2011. (Year: 2011).*

(Continued)

*Primary Examiner* — Jason W Blust
(74) *Attorney, Agent, or Firm* — Nathan M. Rau (57) ABSTRACT

Operation of a multi-slice processor that includes a plurality of execution slices. Operation of such a multi-slice processor includes: determining, by a hypervisor, that consumption of memory controller resources, by a plurality of processing threads, is above a threshold quantity, wherein respective processing threads of the plurality of processing threads control respective prefetch settings; and responsive to determining that the consumption of the memory controller resources is above the threshold quantity, modifying individual memory controller usage of at least one of the plurality of processing threads such that the consumption of the memory controller resources is reduced below the threshold quantity.

20 Claims, 5 Drawing Sheets

(56) References Cited

U.S. PATENT DOCUMENTS

| | | | |
|---|---|---|---|
| 2014/0122801 A1* | 5/2014 | Loh | G06F 13/1663 |
| | | | 711/118 |
| 2014/0223109 A1 | 8/2014 | Heyrman et al. | |
| 2015/0039838 A1 | 2/2015 | Tarasuk-Levin et al. | |
| 2017/0083474 A1* | 3/2017 | Meswani | G06F 13/4234 |
| 2017/0147493 A1* | 5/2017 | Eickemeyer | G06F 12/0862 |

OTHER PUBLICATIONS

Ebrahimi, Coordinated Control of Multiple Prefetchers in Multi-Core Systems, Micro'09, Dec. 12-16, 2009, New York, NY, USA. (Year: 2009).*

Ebrahimi, Many-Thread Aware Prefetching Mechanisms for GPGPU Applications, proceedings of the 43rd Annual IEEE/ACM International Symposium on Microarchitecture (MICRO), Dec. 2010 (Year: 2010).*

Kang et al., "To Hardware Prefetch or Not to Prefetch? A Virtualization Environment Study and Core Binding Approach", Architectural Support for Programming Languages and Operating Systems (ASPLOS '13), Mar. 2013, pp. 357-38, ACM, New York, USA, DOI: 10.1145/2490301.2451155.

Mericas et al., "IBM Powers performance features and evaluation", IBM Journal of Research and Development, vol. 59, Issue 1, dated Jan./Feb. 2015, pp. 6:1-6:10, IEEE Xplore Digital Library (online), DOI: 10.1147/JRD.2014.2380197.

* cited by examiner

OPERATION OF A MULTI-SLICE PROCESSOR IMPLEMENTING ADAPTIVE PREFETCH CONTROL

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Operation of such a multi-slice processor includes: determining, by a hypervisor, that consumption of memory controller resources, by a plurality of processing threads, is above a threshold quantity, wherein respective processing threads of the plurality of processing threads control respective prefetch settings; and responsive to determining that the consumption of the memory controller resources is above the threshold quantity, modifying individual memory controller usage of at least one of the plurality of processing threads such that the consumption of the memory controller resources is reduced below the threshold quantity.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
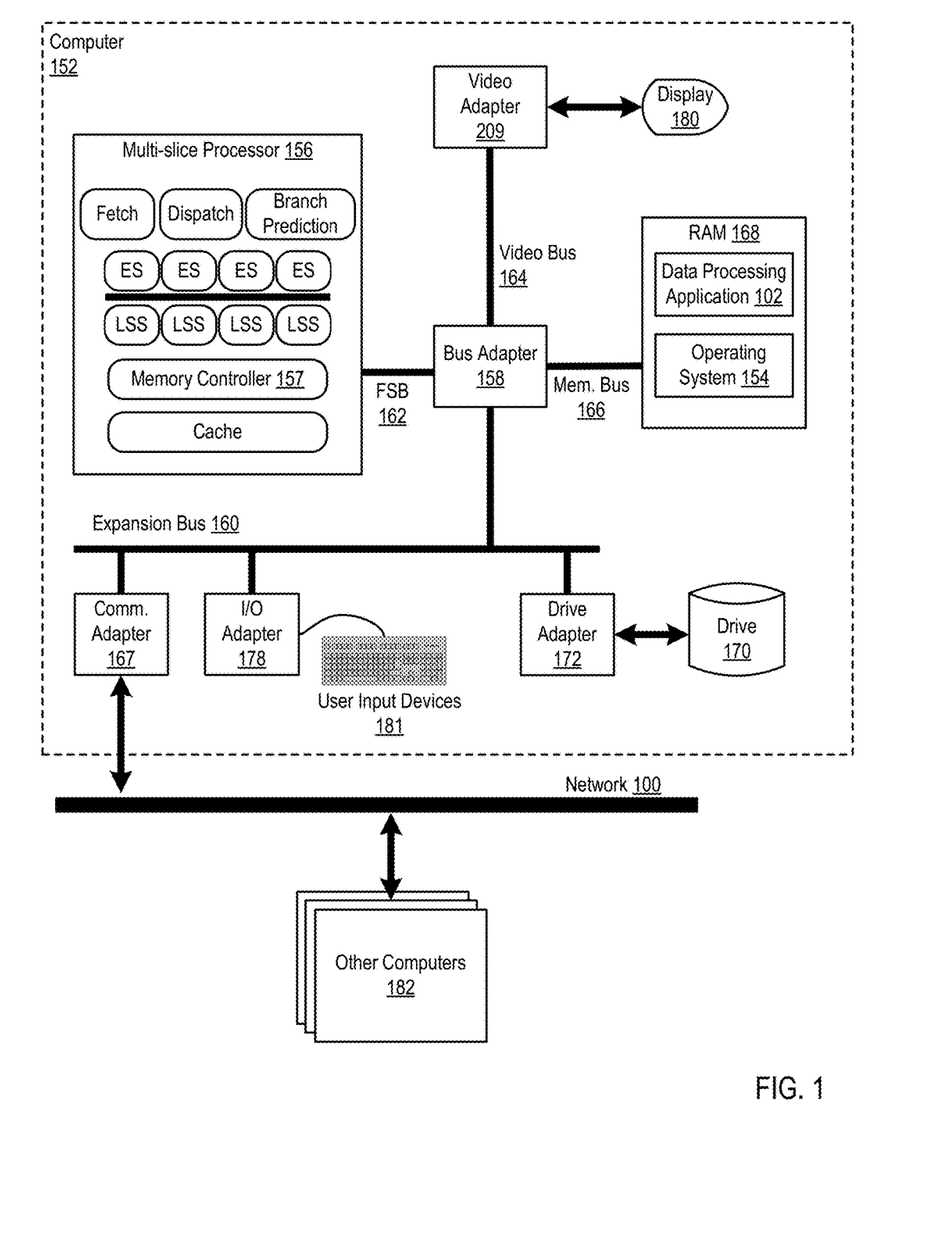
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, branch prediction logic, and a memory controller (157). Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller (157) configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
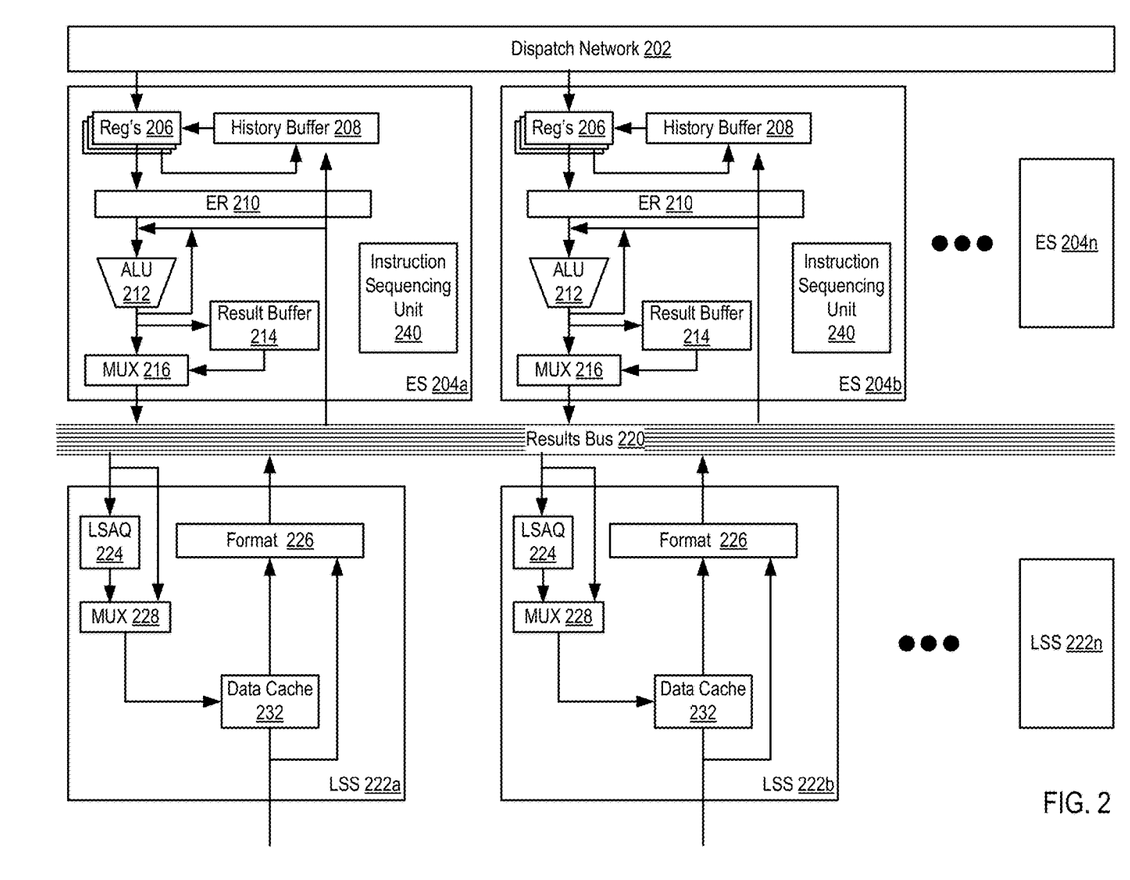
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same logical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The issue queue may also include a single entry per single instruction, where the single entry handles all operands for the single instruction. The execution reservation station may issue a complete instruction at a time, including the operands for the instruction when the operands for the instruction are ready, for execution—depending on whether the instruction is a load/store instruction or an arithmetic instruction—by the arithmetic logic unit (ALU) (212) or to a load/store slice (222a, 222b, 222c) via the results bus (220). For example, the execution reservation station may determine that data for all operands is available, and in response, the execution reservation station may issue the instruction to the arithmetic logic unit (212).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then be issued to any other slice for performance benefits. Further, an instruction may also be executed by a different execution slice than the execution slice from which the instruction is issued. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a load/store access queue (LSAQ) (224), a multiplexer (MUX) (228), a data cache (232), and formatting logic (226), among other components described below with regard to FIG. 3. The load/store access queue (224) receives load and store operations to be carried out by the load/store slice (222). The formatting logic (226) formats data into a form that may be returned on the results bus (220) to an execution slice as a result of a load or store instruction. The multiplexer (228) may select an input in dependence upon data from the load/store access queue (224) or on receiving data from the results bus.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including branch mispredictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5. In other words, in this example, instruction B is moved back into the entry of the general purpose register for logical register 5 instead of instruction A because instruction B was not flushed. However, in this example, if instruction C and instruction B been flushed, then instruction A would have been selected to be moved back to the history buffer.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one or more logical registers as its source, may also target another one or more logical registers for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted within individual execution slices, in some cases, the instruction sequencing unit may be implemented independently of the execution slices or implemented within dispatch network (202). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an instruction tag (ITAG). Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
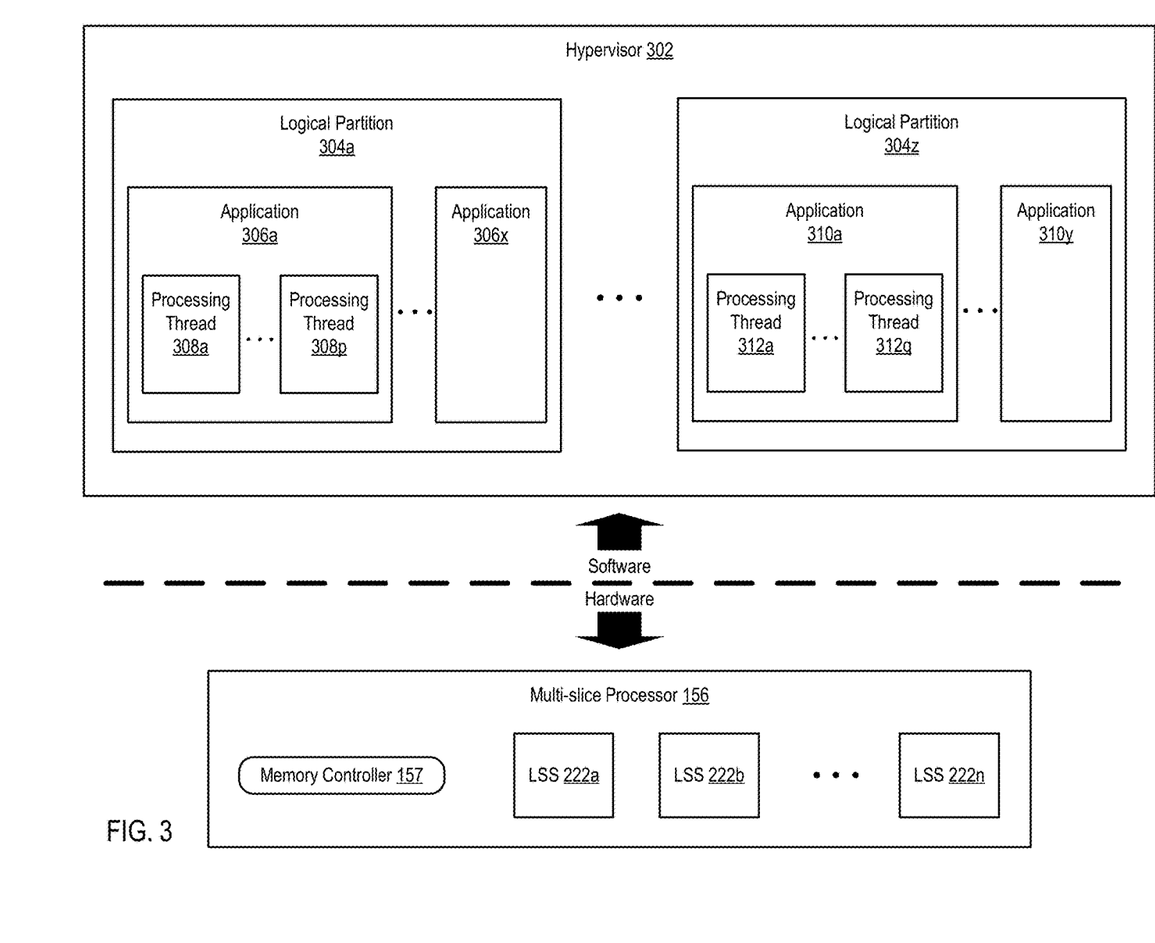
FIG. 3 sets forth a block diagram depicting a hierarchical organization of computing processes within a virtual computing environment where an implementation of adaptive prefetch control may allow for managed allocation of memory controller resources according to different embodiments.

For further explanation, FIG. 3 sets forth a block diagram depicting a hierarchical organization of computing processes within a virtual computing environment where an implementation of adaptive prefetch control may allow for managed allocation of memory controller resources, including the components of a load/store slice used in retrieving data from any tier of memory storage.

In this example hierarchy of computing processes, a hypervisor (302) may create, or manage, multiple logical partitions (304a-304z), where a logical partition may include multiple computer applications, and where a particular computer application may include one or more processing threads. Specifically, in this example, logical partition (304a) may include applications (306a-306x), where application (306a) includes processing threads (308a-308p). Similarly, in this example, logical partition (304z) may include applications (310a-310y), where application (310a) includes processing threads (312a-312q).

Memory controller resources of a multi-slice processor (156) may include one or more computational units of a computer processor that prefetch instructions or data from one or more levels of memory. In this example, the memory controller resources may include one or more of the load/store slices (222a-222n). The memory controller resources may also include the memory controller (157).

Prefetching generally provides for hiding, or reducing, cache miss effects by retrieving data speculatively such that the retrieved data is at a closer level of memory to a processing core when the data is needed. Prefetching may include detection of strided memory access, which may become predictable, and one or more cache lines may be requested to be retrieved as a result of detecting a prefetch pattern. Further, a "ramp" of a prefetch, which may be specified in a prefetch control setting, may specify how quickly after a miss or subsequent strided access a next set of potential lines are requested from the memory controller.

Adaptive prefetch control allows for balancing between multiple demands for memory controller resources—including balancing the ability to allow individual processing threads the flexibility to define prefetch settings against a hypervisor ensuring that overall system performance satisfies one or more computing, or financial, commitments or goals. For example, adaptive prefetch controls may be dynamically set for logical partitions, where the prefetch control settings may alternate between aggressive prefetching, conservative prefetching, or a setting in between aggressive and conservative prefetching.

In this example, the adaptive prefetch controls for a particular logical partition may be set within the particular logical partition independently of other logical partitions. Further, due to a variable mix of individual prefetch control settings, overall demand on memory controller resources may fluctuate. In some cases, such as if too many logical partitions set aggressive prefetch control settings, fluctuation of demand on memory controller resources may exceed a quantity that allows for the hypervisor to provide computational resources at a specified level. In some examples, different logical partitions may have different quality of service commitments.

As one example, if demand on memory controller resources is too high, then one or more logical partitions with high quality of service commitments may be unable to operate, or execute, applications such that the high quality of service commitment is satisfied. In such an instance, the hypervisor may override, limit, or throttle, individual prefetch control settings for some of the logical partitions with lower quality of service commitments, or no quality of service commitments, such that a selected one or more logical partitions with high quality of service commitments may use a share of memory controller resources sufficient to satisfy quality of service commitments. In some examples, for a particular logical partition that has adaptive prefetch controls that have been overridden, or reduced in scope, by a hypervisor, the particular logical partition may still be allowed to adjust prefetch control settings within the reduced scope of prefetch control settings specified by the hypervisor.

In this way, individual processing threads, at one or more lower hierarchical processing levels, may be granted permission to flexibly adjust prefetch control settings that may allow for efficient program execution—while a hypervisor, at a highest level, may manage, and in some cases limit, memory controller resource usage in order to satisfy one or more computing, financial, contractual, or other commitments. This type of hypervisor management of memory controller resource usage through adaptive prefetch control may allow for high customer satisfaction in virtual computing environments, where customers specify varying levels of demand for computing resources and performance when creating virtual computing environments.

For example, one or more computer applications executing within a logical, or virtual, partition of a virtual computing environment may be granted access, or permission, to define prefetch controls that may control whether prefetching for a particular application is aggressive, conservative, or some other setting. In some cases, a computer application may include one or more processing threads that may be granted access, or permission, to define prefetch controls.

Figure 4:
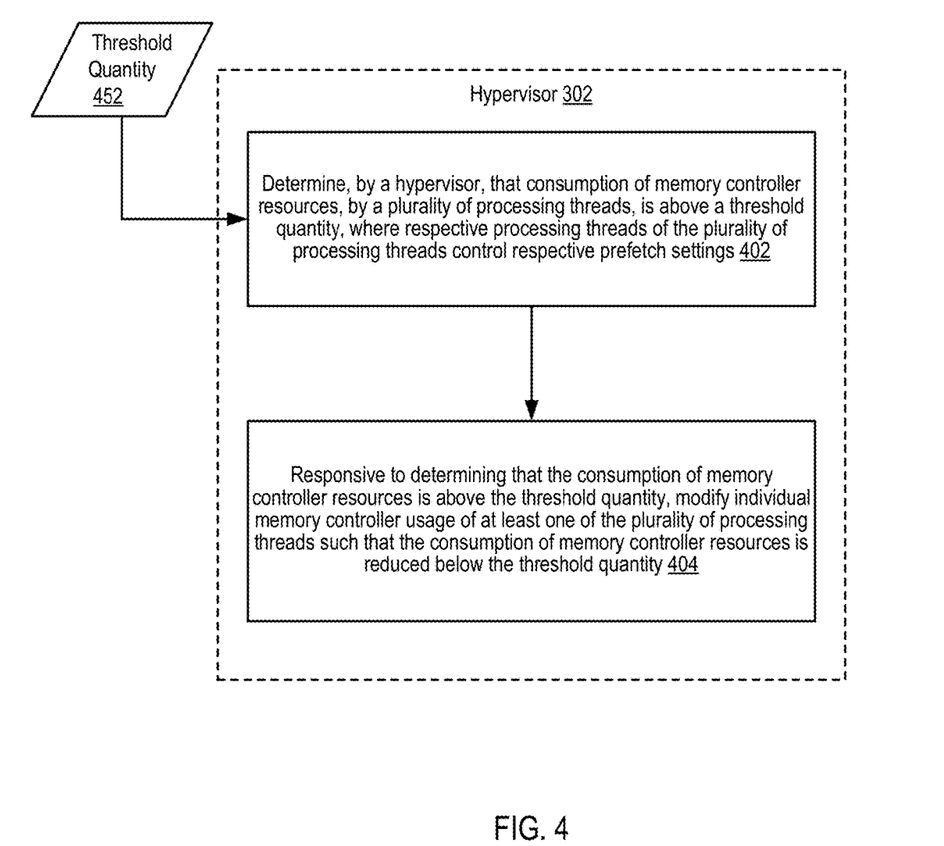
FIG. 4 sets forth a flow chart illustrating an exemplary method of implementing adaptive prefetch control according to different embodiments.

For further explanation, FIG. 4 sets forth a flow chart illustrating an exemplary method of implementing adaptive prefetch control. In this example, a hypervisor may be operating within a virtual computing environment with multiple logical partitions, as described above with regard to FIG. 3. The method of FIG. 4 may be carried out by a computer processor, such as a multi-slice processor, similar to that in the examples of FIGS. 1-3. However, in some examples, the method of FIG. 4 may be carried out by a single core processor with a single memory controller.

The method of FIG. 4 includes determining (402), by a hypervisor (302), that consumption of memory controller resources, by a plurality of processing threads, is above a threshold quantity (452), where respective processing threads of the plurality of processing threads control respective prefetch settings. Determining (402) that consumption of memory controller resources is above a threshold quantity (452) may be carried out by the hypervisor accessing prefetch metrics such as status information on prefetch requests, amount of data requested by prefetch requests, numbers of prefetch requests, prefetch request delay information, among other possible prefetch metrics, and comparing the prefetch metrics against a stored threshold quantity (452).

As described above, individual processing threads may be granted permission to define prefetch control settings according to individual needs, where different individual processing threads may define respective prefetch control settings. For example, a prefetch control setting may allow for setting a default hardware setting, setting a conservative prefetch setting, or setting an aggressive, or unlimited, prefetch setting.

Further, consumption of memory controller resources may be an aggregate of individual consumption of the plurality of processing threads, where the processing threads may be executing within one or more logical partitions of a virtual computing environment. For example, the virtual computing environment may be in a data center of a cloud services provider, where the virtual computing environment may provide interfaces and controls for specifying quality of service agreements, the threshold quantity of memory controller resources, or other environmental and computing variables for the virtual computing environment.

In some examples, the threshold quantity (452) may be defined by a user, such as a system administrator, or other user with privileges for defining system behavior. For example, a threshold quantity (452) may be a percentage of a maximum bandwidth, or maximum throughput, or some other specified prefetch metric. The threshold quantity (452) may be defined in dependence upon an amount of work performed by a memory controller above which one or more processing threads may be unable to satisfy quality of service commitments, or other commitments described above.

The method of FIG. 4 also includes, responsive to determining (402) that the consumption of memory controller resources is above the threshold quantity (452), modifying (404) individual memory controller usage of at least one of the plurality of processing threads such that the consumption of memory controller resources is reduced below the threshold quantity. Modifying (404) individual controller usage may be carried out by the hypervisor setting a prefetch control setting for a processing thread and removing permission for the processing thread to modify the prefetch control setting—where the hypervisor setting the prefetch control setting may override a previous prefetch control setting specified by the processing thread.

Modifying (404) individual controller usage may further be carried out by determining an amount, or quantity, by which to limit prefetch control settings for one or more processing threads such that consumption of memory controller resources is reduced below the threshold quantity. For example, if there are N processing threads, where A processing threads are subject to a quality of service agreement at a certain level, and where B processing threads are subject to a quality of service agreement at a certain level that is lower than the level for the A processing threads—where in this example, the A processing threads are unable to satisfy their respective quality of service agreements. Further, if modifying the prefetch control settings for the B processing threads from aggressive to conservative still allows the B processing threads to satisfy quality of service agreements, and where the resulting resource availability for the memory controller is increased such that the memory controller may devote increased resources to the A processing threads, where the increased resources to the A processing threads allows the A processing threads to satisfy their respective quality of service agreements. In some cases, the modification of the prefetch control settings for the B processing threads may drop below a level to satisfy respective quality of service agreements so that the A processing threads may satisfy their respective quality of service agreements.

In some cases, instead of the hypervisor determining that consumption of memory controller resources is above a threshold quantity, the hypervisor may detect that a bottleneck condition exists for the memory controller or memory controllers. Further, in this case, the hypervisor may, in dependence upon determining the bottleneck, perform modifying (404) individual memory controller usage until the bottleneck is cleared.

Figure 5:
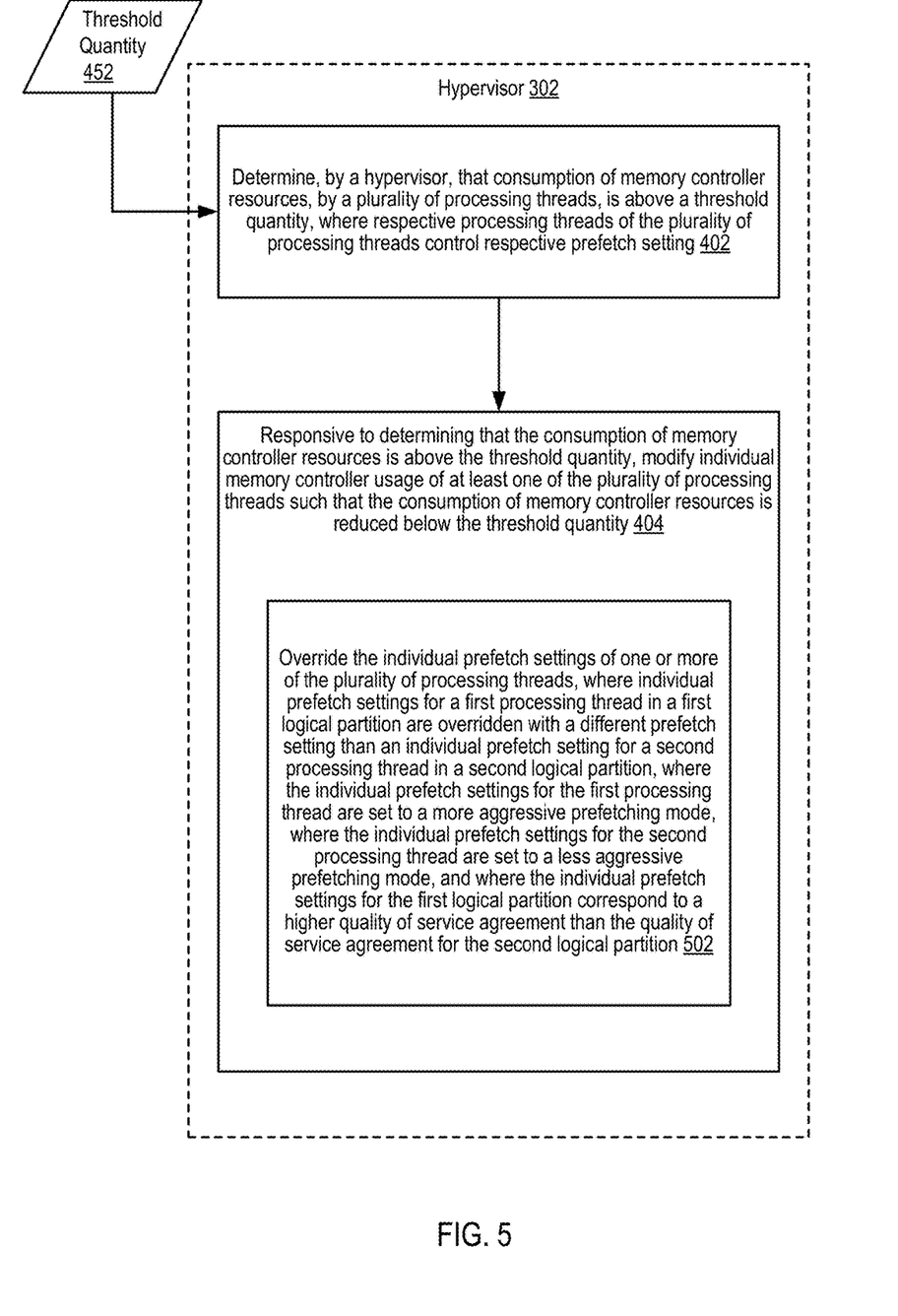
FIG. 5 sets forth a flow chart illustrating an exemplary method of implementing adaptive prefetch control according to different embodiments.

For further explanation, FIG. 5 sets forth a flow chart illustrating an exemplary method of implementing adaptive prefetch control. In this example, a hypervisor may be operating within a virtual computing environment with multiple logical partitions, as described above with regard to FIG. 3. The method of FIG. 5 may be carried out by a computer processor, such as a multi-slice processor, similar to that in the examples of FIGS. 1-3. However, in some examples, the method of FIG. 5 may be carried out by a single core processor with a single memory controller The method of FIG. 5 is similar to the method of FIG. 4 in that the method of FIG. 5 also includes: determining (402), by a hypervisor (302), that consumption of memory controller resources, by a plurality of processing threads, is above a threshold quantity (452), where respective processing threads of the plurality of processing threads control respective prefetch settings; and responsive to determining (402) that the consumption of memory controller resources is above the threshold quantity (452), modifying (404) individual memory controller usage of at least one of the plurality of processing threads such that the consumption of memory controller resources is reduced below the threshold quantity.

The method of FIG. 5 differs from the method of FIG. 4, however, in that the method of FIG. 5 further specifies that modifying (404) individual memory controller usage may include overriding (502) the individual prefetch settings of one or more of the plurality of processing threads, where individual prefetch settings for a first processing thread in a first logical partition are overridden with a different prefetch setting than an individual prefetch setting for a second processing thread in a second logical partition, where the individual prefetch settings for the first processing thread are set to a more aggressive prefetching mode, where the individual prefetch settings for the second processing thread are set to a less aggressive prefetching mode, and where the individual prefetch settings for the first logical partition correspond to a higher quality of service agreement than the quality of service agreement for the second logical partition.

Overriding (502) the individual prefetch settings may be carried out by the hypervisor setting a prefetch control setting for a processing thread and removing permission for the processing thread to modify the prefetch control setting—where the hypervisor setting the prefetch control setting may override a previous prefetch control setting specified by the processing thread. Further, as discussed above, the hypervisor may determine amounts, or quantities, by which to limit prefetch control settings for one or more processing threads according to respective quality of service agreements for the one or more processing threads.

For example, a hypervisor (302) may, per partition, per application, or per processing thread, specify a hardware prefetch setting that may override a prefetch setting at a lower hierarchical level. The hypervisor may specify a hardware prefetch mode to be a default performance value, a conservative default, a capped value, or an unlimited value. A default performance value may allow for hardware identification of prefetch patterns, and hardware-specified levels of aggressiveness based on a determined confidence in the prefetch. A conservative default may allow for hardware identification of prefetch patterns, and hardware-specified levels of aggressiveness that are less than the levels for the default performance value. A capped value may be a defined, non-flexible, level of prefetch. An unlimited value may allow for prefetch to be set to any level of aggressive prefetching or any level of conservative prefetching.

Further, a hypervisor (302) may, per partition, per application, or per processing thread, specify a software prefetch setting that may override a prefetch setting at a lower hierarchical level. The hypervisor may specify a limit for prefetch queue entries, or requests that are allowed per partition, per application, or per processing thread.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
determining, by a hypervisor, that consumption of memory controller resources, by a plurality of processing threads, is above a threshold quantity, wherein respective processing threads of the plurality of processing threads control respective prefetch settings;
responsive to determining that the consumption of the memory controller resources is above the threshold quantity, modifying, by the hypervisor, individual memory controller usage of at least one of the plurality of processing threads such that the consumption of the memory controller resources is reduced below the threshold quantity; and
wherein modifying the individual memory control usage of the at least one of the plurality of processing threads comprises:
reducing, by the hypervisor, a scope of individual prefetch settings of the at least one of the plurality of processing threads; and
permitting, by the hypervisor, the at least one of the plurality of processing threads to modify the individual prefetch settings within the reduced scope.

2. The method of claim 1, wherein the consumption of memory controller resources is an aggregate of individual consumption of the plurality of processing threads.

3. The method of claim 2, wherein the plurality of processing threads are executing within one or more logical partitions of a virtual computing environment of a cloud services provider, and wherein the virtual computing environment provides an interface for specifying the threshold quantity.

4. The method of claim 1, wherein modifying individual memory controller usage is dependent on a quality of service agreement.

5. The method of claim 1, wherein the respective individual prefetch settings are defined according to memory access patterns for the respective processing threads.

6. The method of claim 1, wherein modifying individual memory controller usage comprises:
overriding the individual prefetch settings of one or more of the plurality of processing threads, wherein individual prefetch settings for a first processing thread in a first logical partition are overridden with a different prefetch setting than an individual prefetch setting for a second processing thread in a second logical partition, wherein individual prefetch settings for the first processing thread are set to a more aggressive prefetching mode, wherein the individual prefetch settings for the second processing thread are set to a less aggressive prefetching mode, and wherein the individual prefetch settings for the first processing thread correspond to a higher quality of service agreement than a quality of service agreement for the second processing thread.

7. The method of claim 1, wherein the memory controller resources are for a plurality of memory controllers.

8. A computer processor comprising:
an execution unit and a memory controller, wherein the computer processor is configured to carry out:
determining, by a hypervisor, that consumption of memory controller resources, by a plurality of processing threads, is above a threshold quantity, wherein respective processing threads of the plurality of processing threads control respective prefetch settings;
responsive to determining that the consumption of the memory controller resources is above the threshold quantity, modifying, by the hypervisor, individual memory controller usage of at least one of the plurality of processing threads such that the consumption of the memory controller resources is reduced below the threshold quantity; and
wherein modifying the individual memory control usage of the at least one of the plurality of processing threads comprises:
reducing, by the hypervisor, a scope of individual prefetch settings of the at least one of the plurality of processing threads; and
permitting, by the hypervisor, the at least one of the plurality of processing threads to modify the individual prefetch settings within the reduced scope.

9. The computer processor of claim 8, wherein the consumption of memory controller resources is an aggregate of individual consumption of the plurality of processing threads.

10. The computer processor of claim 9, wherein the plurality of processing threads are executing within one or more logical partitions of a virtual computing environment of a cloud services provider, and wherein the virtual computing environment provides an interface for specifying the threshold quantity.

11. The computer processor of claim 8, wherein modifying individual memory controller usage is dependent on a quality of service agreement.

12. The computer processor of claim 8, wherein the respective individual prefetch settings are defined according to memory access patterns for the respective processing threads.

13. The computer processor of claim 8, wherein modifying individual memory controller usage comprises:
overriding the individual prefetch settings of one or more of the plurality of processing threads, wherein individual prefetch settings for a first processing thread in a first logical partition are overridden with a different prefetch setting than an individual prefetch setting for a second processing thread in a second logical partition, wherein individual prefetch settings for the first processing thread are set to a more aggressive prefetching mode, wherein the individual prefetch settings for the second processing thread are set to a less aggressive prefetching mode, and wherein the individual prefetch settings for the first processing thread correspond to a higher quality of service agreement than a quality of service agreement for the second processing thread.

14. The computer processor of claim 8, wherein the memory controller resources are for a plurality of memory controllers.

15. An apparatus comprising:
a computer processor unit and a memory controller, wherein the computer processor is configured to carry out:
determining, by a hypervisor, that consumption of memory controller resources, by a plurality of processing threads, is above a threshold quantity, wherein respective processing threads of the plurality of processing threads control respective prefetch settings;

responsive to determining that the consumption of the memory controller resources is above the threshold quantity, modifying, by the hypervisor, individual memory controller usage of at least one of the plurality of processing threads such that the consumption of the memory controller resources is reduced below the threshold quantity; and wherein modifying the individual memory control usage of the at least one of the plurality of processing threads comprises:

reducing, by the hypervisor, a scope of individual prefetch settings of the at least one of the plurality of processing threads; and permitting, by the hypervisor, the at least one of the plurality of processing threads to modify the individual prefetch settings within the reduced scope.

16. The apparatus of claim 15, wherein the consumption of memory controller resources is an aggregate of individual consumption of the plurality of processing threads.

17. The apparatus of claim 16, wherein the plurality of processing threads are executing within one or more logical partitions of a virtual computing environment of a cloud services provider, and wherein the virtual computing environment provides an interface for specifying the threshold quantity.

18. The apparatus of claim 15, wherein modifying individual memory controller usage is dependent on a quality of service agreement.

19. The apparatus of claim 15, wherein the respective individual prefetch settings are defined according to memory access patterns for the respective processing threads.

20. The apparatus of claim 19, wherein modifying individual memory controller usage comprises:

overriding the individual prefetch settings of one or more of the plurality of processing threads, wherein individual prefetch settings for a first processing thread in a first logical partition are overridden with a different prefetch setting than an individual prefetch setting for a second processing thread in a second logical partition, wherein individual prefetch settings for the first processing thread are set to a more aggressive prefetching mode, wherein the individual prefetch settings for the second processing thread are set to a less aggressive prefetching mode, and wherein the individual prefetch settings for the first processing thread correspond to a higher quality of service agreement than a quality of service agreement for the second processing thread.

* * * * *